US010535411B2

(12) United States Patent
Dunga et al.

(10) Patent No.: US 10,535,411 B2
(45) Date of Patent: Jan. 14, 2020

(54) SYSTEM AND METHOD FOR STRING-BASED ERASE VERIFY TO CREATE PARTIAL GOOD BLOCKS

(71) Applicant: Western Digital Technologies, Inc., San Jose, CA (US)

(72) Inventors: Mohan Dunga, Santa Clara, CA (US); Anubhav Khandelwal, San Jose, CA (US); Changyuan Chen, San Ramon, CA (US); Biswajit Ray, Huntsville, AL (US)

(73) Assignee: Western Digital Technologies, Inc., San Jose, CA (US)

( * ) Notice: Subject to any disclaimer, the term of this patent is extended or adjusted under 35 U.S.C. 154(b) by 137 days.

(21) Appl. No.: 15/606,931

(22) Filed: May 26, 2017

(65) Prior Publication Data

US 2018/0342304 A1   Nov. 29, 2018

(51) Int. Cl.
*G11C 16/34* (2006.01)
*G06F 3/06* (2006.01)
(Continued)

(52) U.S. Cl.
CPC .......... *G11C 16/3445* (2013.01); *G06F 3/064* (2013.01); *G06F 3/0652* (2013.01); *G06F 12/0246* (2013.01); *G06F 2212/7205* (2013.01); *G06F 2221/2143* (2013.01); *G11C 11/5635* (2013.01); *G11C 16/16* (2013.01); *G11C 16/344* (2013.01); *G11C 16/3436* (2013.01); *G11C 2211/5621* (2013.01); *G11C 2211/5648* (2013.01)

(58) Field of Classification Search
CPC ............... G11C 16/16; G11C 11/5635; G11C 2211/5621; G11C 16/344; G11C 16/3445; G11C 2211/5648; G11C 16/3436; G06F 12/0246; G06F 3/064; G06F 3/0652; G06F 3/344; G06F 3/0604; G06F 2212/7205; G06F 2221/2143
See application file for complete search history.

(56) References Cited

U.S. PATENT DOCUMENTS

2008/0013360 A1* 1/2008 Hemink ............. G11C 11/5635
                                                       365/100
2015/0001607 A1   1/2015 Lee et al.
(Continued)

*Primary Examiner* — April Y Blair
*Assistant Examiner* — Sazzad Hossain
(74) *Attorney, Agent, or Firm* — Dickinson Wright PLLC; Steven Hurles

(57) ABSTRACT

Systems and methods for string-based erase verify to create partial good blocks are disclosed. A block in non-volatile flash memory may include multiple strings. In practice, one string may be slower to erase than other strings. In analyzing the strings, the memory device may iteratively analyze the strings to verify as erased. As one example, the iterations are modified by changing which strings are erased in the subsequent iterations (e.g., only the strings that fail the erase verify). As another example, a predetermined number of iterations are performed after a majority of the strings are verified as erased. In this way, the strings verified as erased need not undergo more deep erasing, which may damage the strings. Further, if fewer than all of the strings are verified as erased, the memory device may designate the block as a partially good block.

18 Claims, 14 Drawing Sheets

(51) Int. Cl.
*G11C 11/56* (2006.01)
*G06F 12/02* (2006.01)
*G11C 16/16* (2006.01)

(56) References Cited

U.S. PATENT DOCUMENTS

| | | |
|---|---|---|
| 2015/0124527 A1 | 5/2015 | Mui et al. |
| 2016/0055918 A1* | 2/2016 | Kochar .............. G11C 16/3445 365/185.11 |
| 2016/0111434 A1 | 4/2016 | Pachamuthu et al. |
| 2018/0286485 A1* | 10/2018 | Takizawa ............... G11C 16/14 |

* cited by examiner

SYSTEM AND METHOD FOR STRING-BASED ERASE VERIFY TO CREATE PARTIAL GOOD BLOCKS

BACKGROUND

Semiconductor memory is used in various electronic devices. For example, non-volatile semiconductor memory is used in cellular telephones, digital cameras, personal digital assistants, mobile computing devices, non-mobile computing devices and other devices. Electrical Erasable Programmable Read Only Memory (EEPROM) and flash memory are examples of non-volatile semiconductor memories.

In one example, EEPROM and flash memory utilize a floating gate that is positioned above and insulated from a channel region in a semiconductor substrate. The floating gate is positioned between the source and drain regions. A control gate is provided over and insulated from the floating gate. The threshold voltage of the transistor is controlled by the amount of charge that is retained on the floating gate. That is, the level of charge on the floating gate controls the minimum amount of voltage to apply to the control gate for the transistor to turn on, and thus permit conduction between its source and drain.

One type of semiconductor memory uses a 3D stacked memory structure. For example, a 3D NAND stacked memory device can be formed from an array of alternating conductive and dielectric layers. A memory hole is drilled in the layers to define many memory layers simultaneously. A NAND string is then formed by filling the memory hole with appropriate materials. A straight NAND string extends in one memory hole, while a pipe- or U-shaped NAND string (P-BiCS) includes a pair of vertical columns of memory cells which extend in two memory holes and which are joined by a bottom back gate. Control gates of the memory cells are provided by the conductive layers.

When programming a 2D or 3D EEPROM or flash memory device, such as a NAND flash memory device, typically a program voltage is applied to the control gate and the bit line is grounded. Electrons from the channel are injected into the floating gate. When electrons accumulate in the floating gate, the floating gate becomes negatively charged and the threshold voltage of the memory cell is raised so that the memory cell is in a programmed state. A program-verify operation can be performed to determine that the threshold voltage of a memory cell has been raised above a desired level.

Similarly, when erasing a flash memory device, an erase voltage is applied, and an erase-verify operation is performed to determine whether the threshold voltages of the memory cells have been decreased below a desired level.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

DETAILED DESCRIPTION OF EMBODIMENTS

Overview

Figure 1A:
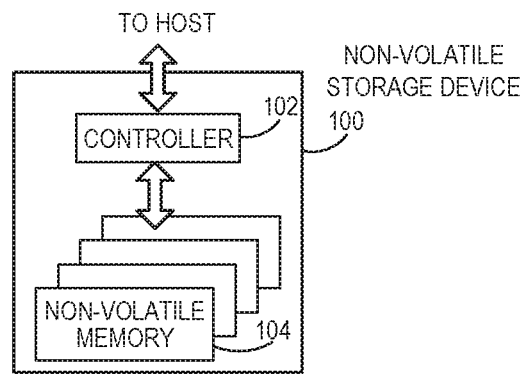
FIG. 1A is a block diagram of an exemplary non-volatile memory system.

In 3D NAND flash technology (such as Bit Cost Scalable (BiCS), including BiCS2, BiCS3), a single block may comprise multiple strings, such as consist of 2 strings, consist of 3 strings, consist of 4 different strings, etc. One or more of the strings may be slower to erase than the remaining strings. In one implementation, erase status (e.g., whether the string passes or fails verification that an erase has occurred) for a block depends on the erase status of all of the strings (e.g., whether all four strings in the block passes). In practice, the good strings are more deeply erased due to the slow-to-erase string(s). In particular, the good strings (e.g., that passed the erase test) and the bad strings (e.g., that failed the erase test) are both subjected to a more severe erase procedure in order to determine whether the bad strings will eventually pass the erase test. However, more severe or deeper erase procedures can degrade the reliability of the block (e.g., increase in program disturb, data retention (DR), and block aging). In some instances the slow-to-erase string ultimately fails the erase status, resulting in marking the entire block as bad or unusable. In this regard, the remaining strings in the block, which are still usable, are nonetheless designated as bad and are unused.

NAND strings may be slow to erase because of various reasons. One potential cause that can make a particular NAND string, within a group of NAND strings in a block, slow to erase is SGS leakage issue. The SGS leakage issue may be evident at time zero or after a few cycles of program and erase.

In one implementation, the memory device may iteratively analyze the NAND strings to verify whether one or more of the NAND strings is verified as erased, with the iteration being modified based on the NAND string(s) that are verified as erased. In a first specific implementation, the iterations are modified by changing which NAND strings are erased in the subsequent iterations. More specifically, the memory device in a first iteration may command the NAND strings to be erased, and verify whether the NAND strings are erased. In a memory device which may perform single-string erases, the memory device on the next iteration may erase only the NAND strings that are not verified as erased. In this way, the NAND strings that are verified as erased need not undergo more deep erasing, which may result in damage to the NAND strings. In a second specific implementation, the number of iterations are modified based on the NAND string(s) which have been verified as erased. More specifically, the memory device may iterate a predetermined number of times after a predetermined number of NAND strings (such as a majority of the NAND strings) are verified as erased. In this way, the strings that are verified as erased need not undergo more deep erasing, which may result in damage to the strings. Further, the below discussion focuses on NAND strings. Other types of strings, such as NOR strings, may alternatively be used. In this regard, any discussion below regarding NAND strings may be applied to other types of strings.

In a second implementation, the memory device may designate some, but not all, of the NAND strings as being verified as erased. More specifically, instead of a single NAND string that fails verification resulting in marking the entire block as bad or unusable, the memory device may mark a block as partially usable, with an indication of which NAND strings in the block are still available for storing data thereto.

Embodiments

The following embodiments describe non-volatile memory devices and related methods for analyzing NAND strings for erase verification. Before turning to these and other embodiments, the following paragraphs provide a discussion of exemplary non-volatile memory devices and storage modules that can be used with these embodiments. Of course, these are just examples, and other suitable types of non-volatile memory devices and/or storage modules can be used.

FIG. 1A is a block diagram illustrating a non-volatile memory device 100. The non-volatile memory device 100 may include a controller 102 and non-volatile memory that may be made up of one or more non-volatile memory dies 104. As used herein, the term die refers to the set of non-volatile memory cells, and associated circuitry for managing the physical operation of those non-volatile memory cells, that are formed on a single semiconductor substrate. The controller 102 may interface with a host device or a host system and transmit command sequences for read, program, and erase operations to the non-volatile memory die(s) 104. As discussed below, the commands may include logical and/or physical addresses.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. One example of the firmware is a flash translation layer. In operation, when a host device needs to read data from or write data to the flash memory, it will communicate with the flash memory controller. In one embodiment, if the host device provides a logical address to which data is to be read/written, the flash memory controller can convert the logical address received from the host to a physical address in the flash memory. The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between the controller 102 and the non-volatile memory die(s) 104 may be any suitable flash interface, such as Toggle Mode 200, 400, or 800. In one embodiment, the memory device 100 may be a card based system, such as a secure digital (SD) or a micro secure digital (micro-SD) card. In an alternate embodiment, the non-volatile memory device 100 may be part of an embedded memory device.

Although in the example illustrated in FIG. 1A, the non-volatile memory device 100 may include a single channel between the controller 102 and the non-volatile memory die(s) 104, the subject matter described herein is not limited to having a single memory channel. For example, in some NAND memory device architectures, 2, 4, 8 or more NAND channels may exist between the controller and the NAND memory die(s) 104, depending on controller capabilities. In any of the embodiments described herein, more than a single channel may exist between the controller and the memory die(s) 104, even if a single channel is shown in the drawings.

Figure 1B:
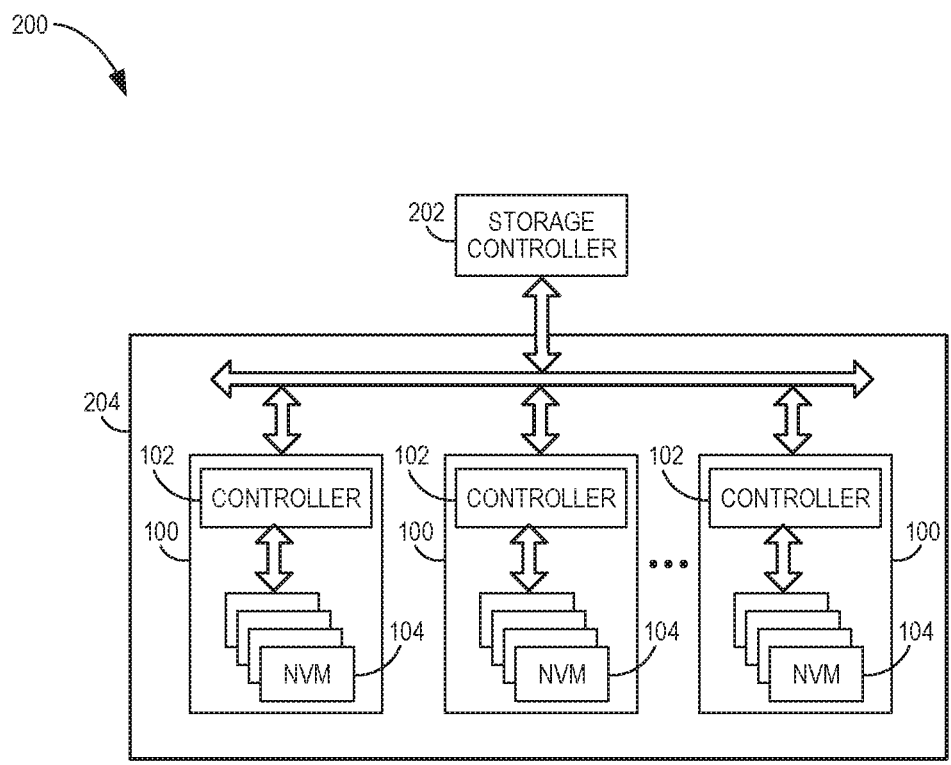
FIG. 1B is a block diagram of a storage module that includes a plurality of non-volatile memory systems and a host.

FIG. 1B illustrates a storage module 200 that includes plural non-volatile memory devices 100. As such, the storage module 200 may include a storage controller 202 that interfaces with a host 220 and with a storage system 204, which includes a plurality of non-volatile memory devices 100. The interface between the storage controller 202 and non-volatile memory devices 100 may be a bus interface, such as a serial advanced technology attachment (SATA), a peripheral component interface express (PCIe) interface, an embedded MultiMediaCard (eMMC) interface, a SD interface, or a Universal Serial Bus (USB) interface, as examples. The storage system 200, in one embodiment, may be a solid state drive (SSD), such as found in portable computing devices, such as laptop computers and tablet computers, and mobile phones.

Figure 1C:
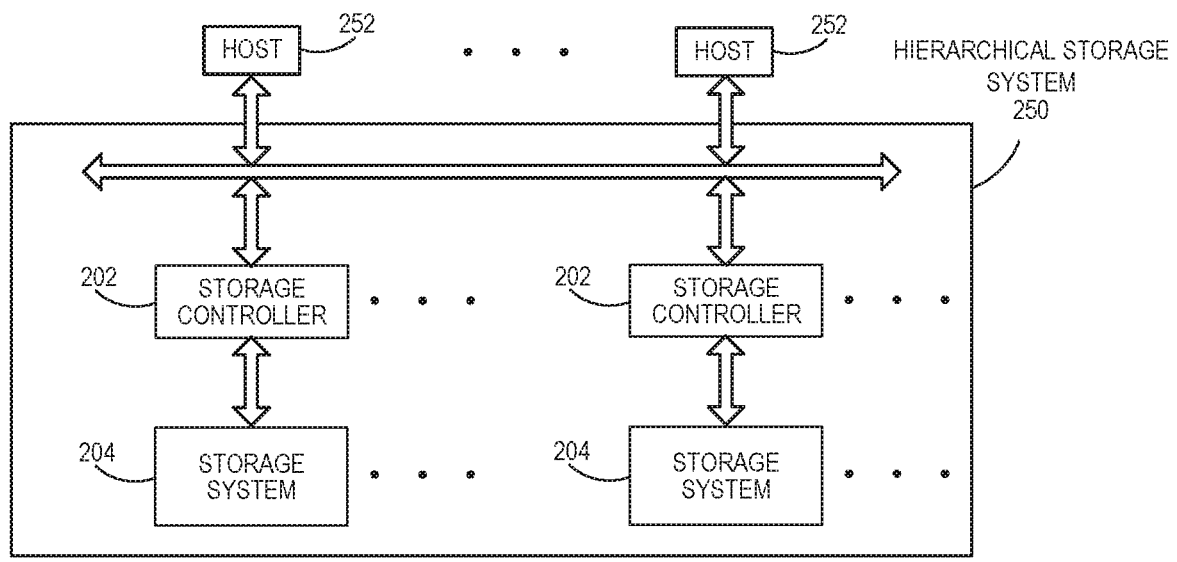
FIG. 1C is a block diagram of a hierarchical storage system.

FIG. 1C is a block diagram illustrating a hierarchical storage system 250. The hierarchical storage system 250 may include a plurality of storage controllers 202, each of which control a respective storage system 204. Host systems 252 may access memories within the hierarchical storage system 250 via a bus interface. Example bus interfaces may include a non-volatile memory express (NVMe), a fiber channel over Ethernet (FCoE) interface, an SD interface, a USB interface, a SATA interface, a PCIe interface, or an eMMC interface as examples. In one embodiment, the hierarchical storage system 250 illustrated in FIG. 1C may be a rack mountable mass storage system that is accessible by multiple host computers, such as would be found in a data center or other location where mass storage is needed. In one embodiment, host systems 252 may include the functionality described in host 220.

Figure 2A:
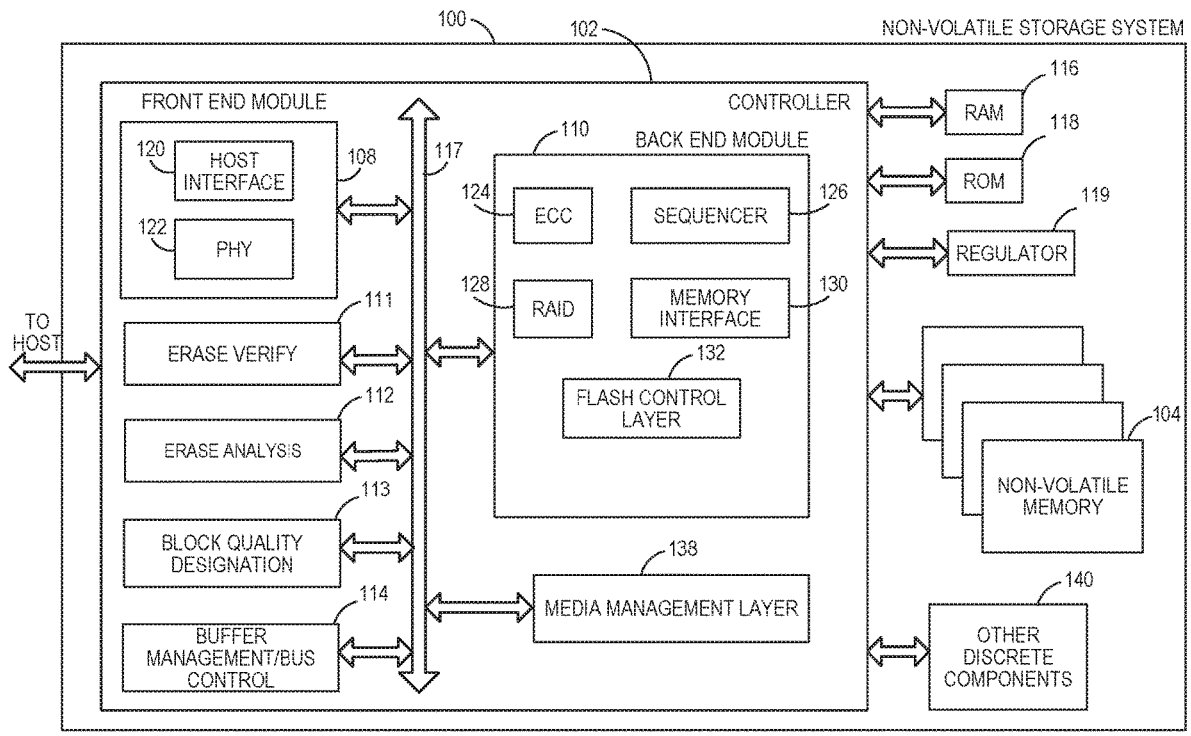
FIG. 2A is a block diagram of exemplary components of a controller of the non-volatile memory system of FIG. 1A.

FIG. 2A is a block diagram illustrating exemplary components of the controller 102 in more detail. The controller 102 may include a front end module 108 that interfaces with a host, a back end module 110 that interfaces with the non-volatile memory die(s) 104, and various other modules that perform various functions of the non-volatile memory device 100. In general, a module may be hardware or a combination of hardware and software. For example, each module may include an application specific integrated circuit (ASIC), a field programmable gate array (FPGA), a circuit, a digital logic circuit, an analog circuit, a combination of discrete circuits, gates, or any other type of hardware or combination thereof. In addition or alternatively, each module may include memory hardware that comprises instructions executable with a processor or processor circuitry to implement one or more of the features of the module. When any one of the module includes the portion of the memory that comprises instructions executable with the processor, the module may or may not include the processor. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 102 may include a buffer manager/bus control module 114 that manages buffers in random access memory (RAM) 116 and controls the internal bus arbitration for communication on an internal communications bus 117 of the controller 102. A read only memory (ROM) 118 may store and/or access system boot code. Although illustrated in FIG. 2A as located separately from the controller 102, in other embodiments one or both of the RAM 116 and the ROM 118 may be located within the controller 102. In yet other embodiments, portions of RAM 116 and ROM 118 may be located both within the controller 102 and outside the controller 102. Further, in some implementations, the controller 102, the RAM 116, and the ROM 118 may be located on separate semiconductor dies. As discussed below, in one implementation, the submission queues and the completion queues may be stored in the Controller Memory Buffer, which may be housed in RAM 116.

Additionally, the front end module 108 may include a host interface 120 and a physical layer interface (PHY) 122 that provide the electrical interface with the host or next level storage controller. The choice of the type of the host interface 120 can depend on the type of memory being used. Examples types of the host interface 120 may include, but are not limited to, SATA, SATA Express, SAS, Fibre Channel, USB, PCIe, and NVMe. The host interface 120 may typically facilitate transfer for data, control signals, and timing signals.

The back end module 110 may include an error correction controller (ECC) engine 124 that encodes the data bytes received from the host, and decodes and error corrects the data bytes read from the non-volatile memory die(s) 104. As discussed in more detail below, the ECC engine may be tunable, such as to generate different amounts of ECC data based on the mode (e.g., generate normal mode ECC data in normal programming mode and generate burst mode ECC data in burst programming mode, with the burst mode ECC data being greater than the normal mode ECC data). The back end module 110 may also include a command sequencer 126 that generates command sequences, such as program, read, and erase command sequences, to be transmitted to the non-volatile memory die(s) 104. Additionally, the back end module 110 may include a RAID (Redundant Array of Independent Drives) module 128 that manages generation of RAID parity and recovery of failed data. The RAID parity may be used as an additional level of integrity protection for the data being written into the non-volatile memory device 100. In some cases, the RAID module 128 may be a part of the ECC engine 124. A memory interface 130 provides the command sequences to the non-volatile memory die(s) 104 and receives status information from the non-volatile memory die(s) 104. Along with the command sequences and status information, data to be programmed into and read from the non-volatile memory die(s) 104 may be communicated through the memory interface 130. In one embodiment, the memory interface 130 may be a double data rate (DDR) interface, such as a Toggle Mode 200, 400, or 800 interface. A flash control layer 132 may control the overall operation of back end module 110.

Thus, the controller 102 may include one or more management tables for managing operations of non-volatile memory device 100. One type of management table includes logical-to-physical address mapping table. The size of logical-to-physical address mapping table may grow with memory size. In this regard, the logical-to-physical address mapping table for high capacity storage device (e.g., greater than 32 G) may be too large to store in SRAM, are may be stored in non-volatile memory 104 along with user and host data. Therefore, accesses to non-volatile memory 104 may first require reading the logical-to-physical address mapping table from non-volatile memory 104.

Additional modules of the non-volatile memory device 100 illustrated in FIG. 2A may include a media management layer 138, which performs wear leveling of memory cells of the non-volatile memory die 104. The non-volatile memory device 100 may also include other discrete components 140, such as external electrical interfaces, external RAM, resistors, capacitors, or other components that may interface with controller 102. In alternative embodiments, one or more of the RAID module 128, media management layer 138 and buffer management/bus controller 114 are optional components that may not be necessary in the controller 102.

Other modules of the non-volatile memory device 100 illustrated in FIG. 2A may include erase verify module 111, erase analysis module 112, and block quality designation module 113. As discussed in more detail below, the memory device may use the erase verify module 111 in order to determine whether a string is verified as having been erased. Erase analysis module 112 may be used to control the iterative erase procedures, discussed in more detail below. Finally, the block quality designation module 113 is configured to designate a block as being entirely good (e.g., all strings within the block have been verified as erased), partially good (e.g., some but not all strings within the block have been verified as erased), or bad (e.g., none of the strings within the block have been verified as erased), as discussed below.

Figure 2B:
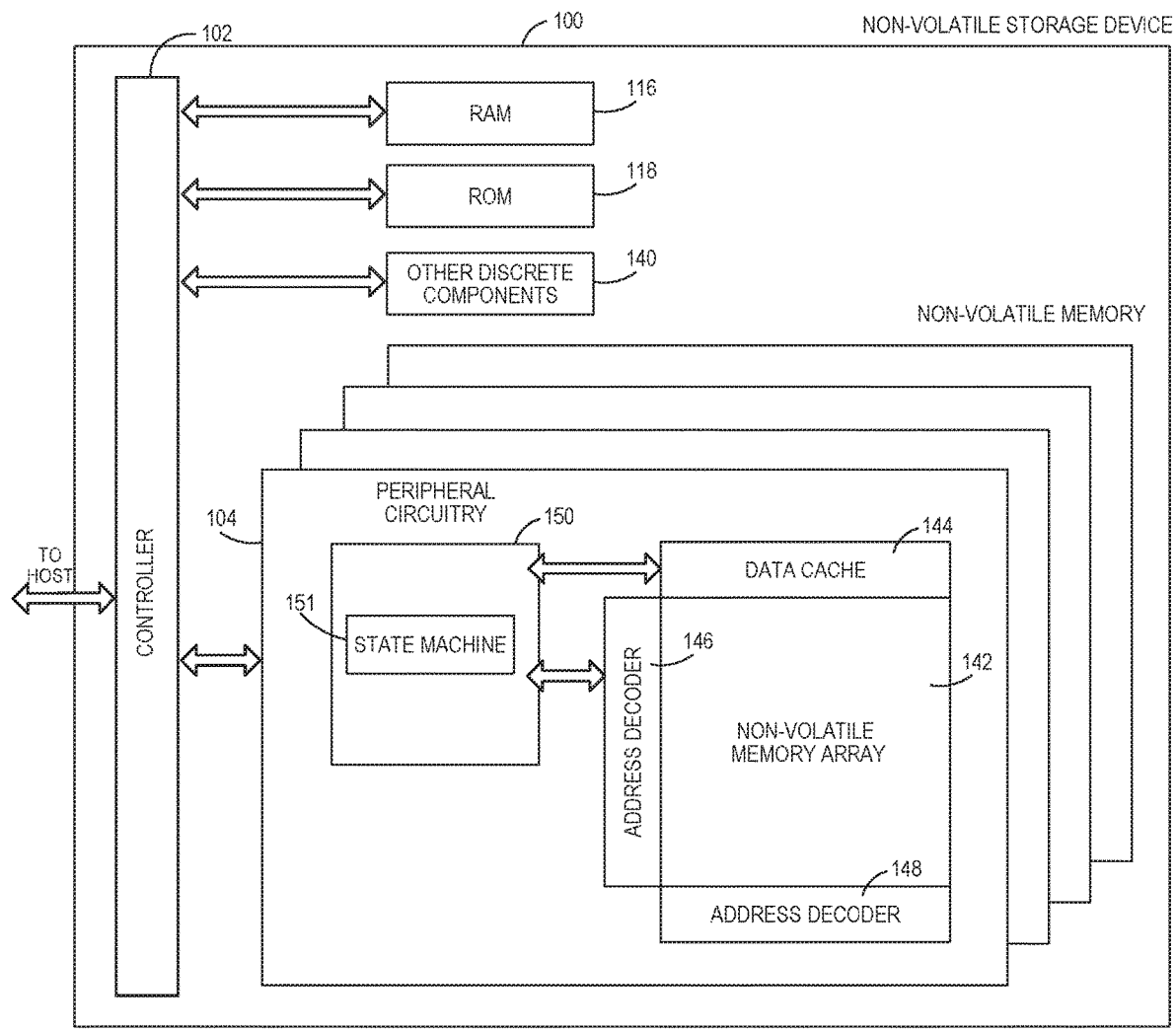
FIG. 2B is a block diagram of exemplary components of a non-volatile memory die of the non-volatile memory system of FIG. 1A.

FIG. 2B is a block diagram illustrating exemplary components of a non-volatile memory die 104 in more detail. The non-volatile memory die 104 may include a non-volatile memory array 142. The non-volatile memory array 142 may include a plurality of non-volatile memory elements or cells, each configured to store one or more bits of data. The non-volatile memory elements or cells may be any suitable non-volatile memory cells, including NAND flash memory cells and/or NOR flash memory cells in a two dimensional and/or three dimensional configuration. The memory cells may take the form of solid-state (e.g., flash) memory cells and can be one-time programmable, few-time programmable, or many-time programmable. In addition, the memory elements or cells may be configured as single-level cells (SLCs) that store a single bit of data per cell, multi-level cells (MLCs) that store multiple bits of data per cell, or combinations thereof. For some example configurations, the multi-level cells (MLCs) may include triple-level cells (TLCs) that store three bits of data per cell.

Additionally, a flash memory cell may include in the array 142 a floating gate transistor (FGT) that has a floating gate and a control gate. The floating gate is surrounded by an insulator or insulating material that helps retain charge in the floating gate. The presence or absence of charges inside the floating gate may cause a shift in a threshold voltage of the FGT, which is used to distinguish logic levels. That is, each FGT's threshold voltage may be indicative of the data stored in the memory cell. Hereafter, FGT, memory element and memory cell may be used interchangeably to refer to the same physical entity.

The memory cells may be disposed in the memory array 142 in accordance with a matrix-like structure of rows and columns of memory cells. At the intersection of a row and a column is a FGT (or memory cell). A column of FGTs may be referred to as a string. FGTs in a string or column may be electrically connected in series. A row of FGTs may be referred to as a page. Control gates of FGTs in a page or row may be electrically connected together.

The memory array 142 may also include wordlines and bitlines connected to the FGTs. Each page of FGTs is coupled to a wordline. In particular, each wordline may be coupled to the control gates of FGTs in a page. In addition, each string of FGTs may be coupled to a bitline. Further, a single string may span across multiple wordlines, and the number of FGTs in a string may be equal to the number of pages in a block.

The non-volatile memory die 104 may further include a page buffer or data cache 144 that caches data that is sensed from and/or that is to be programmed to the memory array 142. The non-volatile memory die 104 may also include a row address decoder 146 and a column address decoder 148. The row address decoder 146 may decode a row address and select a particular wordline in the memory array 142 when reading or writing data to/from the memory cells in the memory array 142. The column address decoder 148 may decode a column address to select a particular group of bitlines in the memory array 142 to be electrically coupled to the data cache 144.

In addition, the non-volatile memory die 104 may include peripheral circuitry 150. The peripheral circuitry 150 may include a state machine 151 that provides status information to the controller 102. Other functionality of the state machine 151 is described in further detail below.

Figure 3:
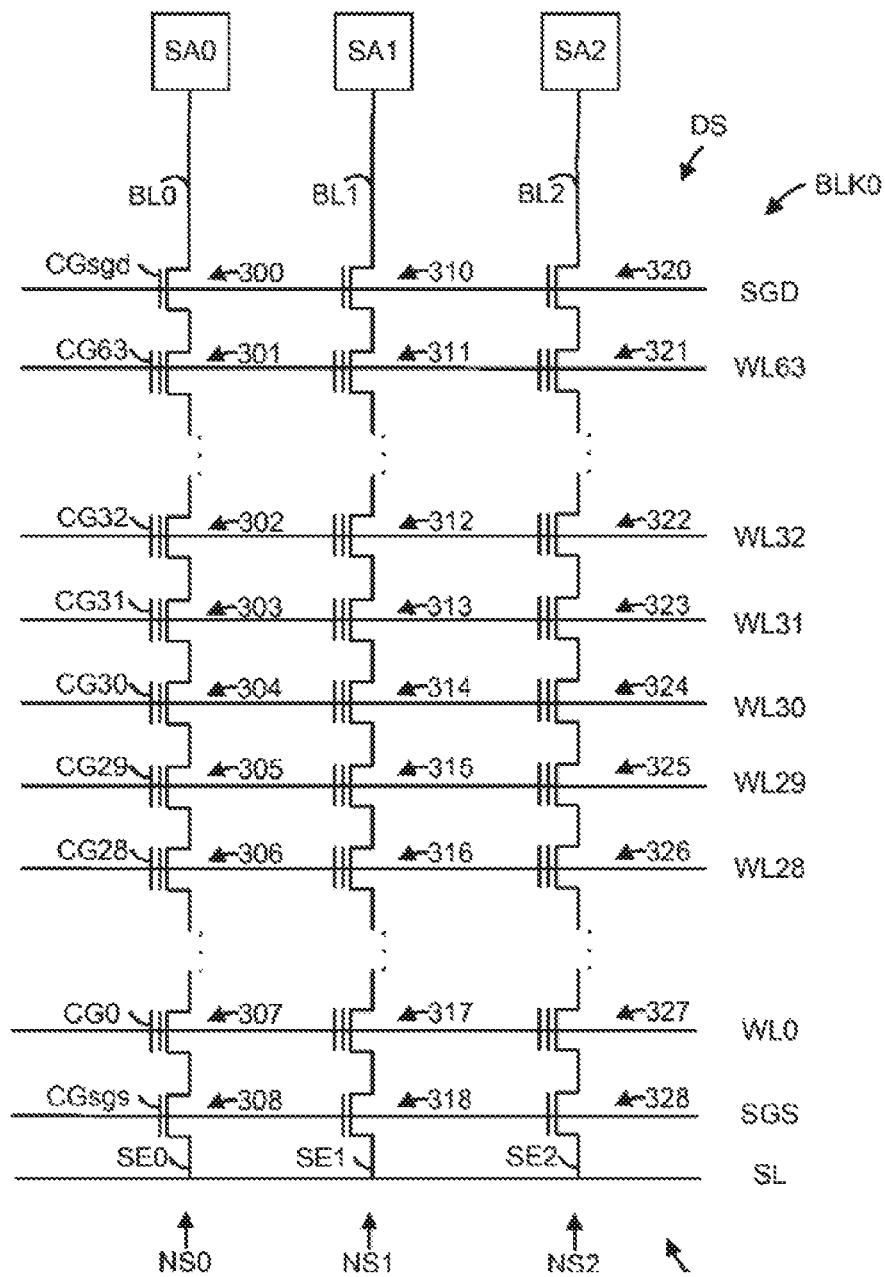
FIG. 3 depicts three example NAND strings in a block BLK0.

FIG. 3 depicts three example NAND strings in a block BLK0. NAND strings are illustrated in US Published Application No. 2015/0124527, which is incorporated by reference herein in its entirety. BLK0 includes a number of NAND strings NS0, NS1, NS2, . . . and respective bit lines, e.g., BL0, BL1, BL2 . . . in communication with respective sense amplifiers SA0, SA1, SA2, . . . BLK0 comprises a set of memory cells (e.g., non-volatile storage elements). Each NAND string is connected at one end to a select gate, drain (SGD) transistor, and the control gates of the SGD transistors are connected via a common SGD line. The NAND strings are connected at their other end to a select gate, source (SGS) transistor which, in turn, is connected to a common source line (SL). A number of word lines WL0-WL63 extend between the SGS and SGD transistors. WL0 is an edge word line which is adjacent to the source side (SS) of the block and WL63 is an edge word line which is adjacent to the drain side (DS) of the block.

An example NAND string NS0 includes memory cells 301, . . . , 302-306, . . . , 307 with respective control gates CG63, . . . CG32-CG28, . . . CG0, an SGS transistor 308 with a control gate CGsgs, and a SGD transistor 300 with a control gate CGsgd. Another example NAND string NS1 includes memory cells 311, . . . , 312-316, . . . , 317, an SGS transistor 318 and a SGD transistor 310. Another example NAND string NS2 includes memory cells 321, . . . , 322-326, . . . , 327, an SGS transistor 328 and a SGD transistor 320. The NAND strings NS0, NS2, . . . are even numbered, and the NAND strings NS1, NS3 (not shown), . . . are odd numbered. Similarly, the bit lines BL0, BL2, . . . are even numbered, and the NAND strings BL1, BL3 (not shown), . . . are odd numbered. The memory cells can store user data and/or non-user data.

Figure 4:
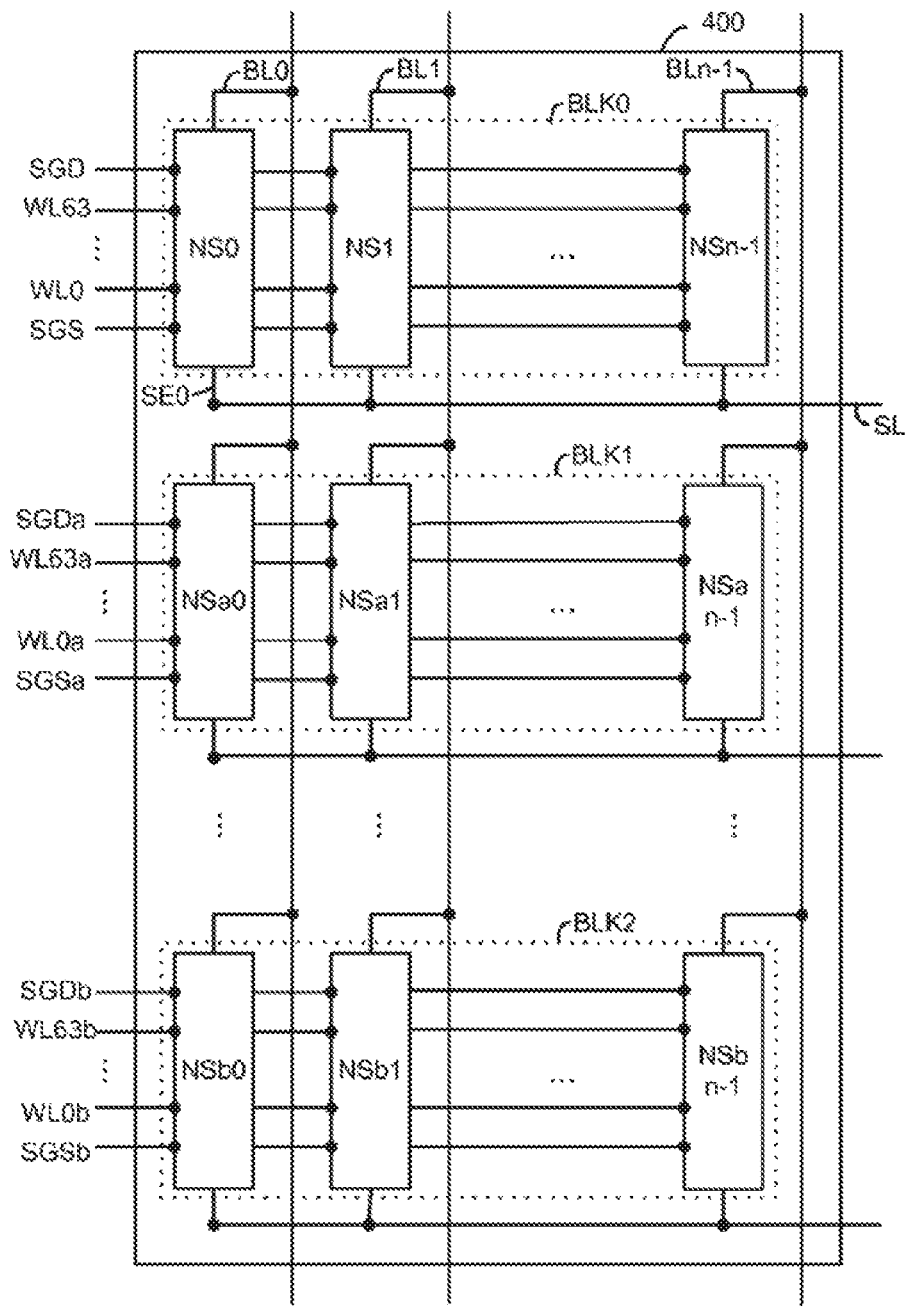
FIG. 4 is a block diagram of an array of NAND flash memory cells including BLK0 of FIG. 3 and additional blocks BLK1 and BLK2.

FIG. 4 is a block diagram of an array 400 of NAND flash memory cells including BLK0 of FIG. 3 and additional blocks BLK1 and BLK2. Along each column, a bit line (BL) is coupled to the drain terminal of the drain select gate for the NAND string. Along each row of NAND strings, a source line (SL) may connect all the source terminals of the source select gates of the NAND strings (e.g., at SE0 of NS0).

The array of memory cells is divided into a large number of blocks (e.g., BLK0-BLK2) of memory cells, where each block includes a set of one or more NAND strings in communication with a common set of word lines, SGS line and SGD line. Each NAND string is also in communication with a respective bit line. For example, BLK0 includes NAND strings NS0, NS1, . . . , NSn−1 in communication with BL0, BL1, . . . BLn−1, respectively, and with WL0-WL63 SGS and SGD. BLK1 includes NAND strings NSa0, NSa1, . . . , NSan−1 in communication with BL0, BL1, . . . BL−1, respectively, and with WL0a-WL63a, SGSa and SGDa. BLK2 includes NAND strings NSb0, NSb1, . . . , NSbn−1 in communication with BL0, BL1, . . . BLn−1, respectively, and with WL0b-WL63b, SGSb and SGDb.

As is common for flash EEPROM systems, the block is the unit of erase. That is, each block contains the minimum number of memory cells that are erased together. Each block is typically divided into a number of pages. A page is the smallest unit of programming. One or more pages of data are typically stored in one row of memory cells. For example, a row typically contains several interleaved pages or it may constitute one page. All memory cells of a page will be read or programmed together.

Memory cells are erased in an example 2D NAND embodiment by raising the p-well to an erase voltage (e.g., 15-20 V) for a sufficient period of time and grounding or applying a low bias, e.g., 1 V, on the word lines of a selected block while the source and bit lines are floating. Due to capacitive cross coupling ("cross" denotes coupling from neighboring memory cells), the bit lines, select lines, and common source are also raised to a significant fraction of the erase voltage. A strong electric field is thus applied to the tunnel oxide layers of selected memory cells and the data of the selected memory cells are erased as electrons of the floating gates are emitted to the substrate side. As electrons are transferred from the floating gate to the p-well region, the threshold voltage of a selected cell is lowered. Erasing can be performed on the entire memory array, separate blocks, or another unit of cells.

Figure 5:
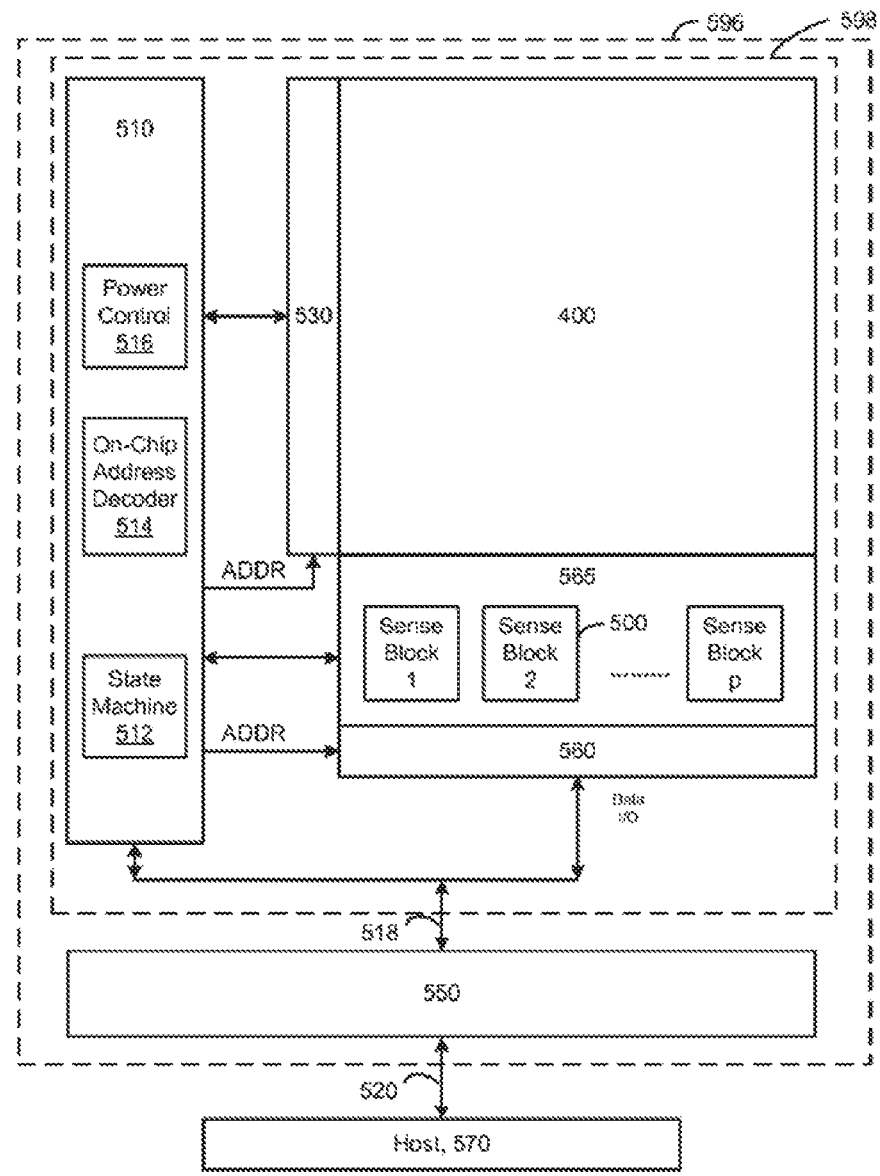
FIG. 5 is a block diagram of a non-volatile memory system which includes the array of FIG. 4.

FIG. 5 is a block diagram of a non-volatile memory system which includes the array of FIG. 4. The non-volatile memory system comprises a memory device 596 having read/write circuits for reading and programming a page of memory cells in parallel, according to one embodiment of the present technology. Memory device 596 may include one or more memory die 598. Memory die 598 includes a two-dimensional array of memory cells 400, control circuitry 510, and read/write circuits 565. The memory array 400 is addressable by word lines via a row decoder 530 and by bit lines via a column decoder 560. The read/write circuits 565 include multiple sense blocks 500 and allow a page of memory cells to be read or programmed in parallel. Typically a controller 550 is included in the same memory device 596 (e.g., a removable storage card) as the one or more memory die 598. Commands and Data are transferred between the host 570 and controller 550 via lines 520 and between the controller and the one or more memory die 598 via lines 518.

The control circuitry 510 cooperates with the read/write circuits 565 to perform memory operations on the memory array 400. The control circuitry 510 includes a state machine 512, an on-chip address decoder 514 and a power control module 516. The state machine 512 provides chip-level control of memory operations. The on-chip address decoder 514 provides an address interface between that used by the host or a memory controller to the hardware address used by the decoders 530 and 560. The power control module 516 controls the power and voltages supplied to the word lines and bit lines during memory operations. In another approach, dual row/column decoders and read/write circuits are used. A control circuit can be considered to comprise one or more of the components 510, 512, 514, 516, 530, 550, 560, 565, for instance.

In response to deciding to perform an erase operation for a block, the memory device may determine a number (Nwl) of programmed word lines in the block. As discussed above, a programmed word line is a word line which is connected to programmed memory cells. The memory device performs an erase operation with an erase-verify test based on Nwl. That is, the erase-verify test is configured based on Nwl. In practice, the erase operation may include initializing the erase voltage, Verase, e.g., to Verase0, applying Verase to the substrate for a 2D NAND memory device or to one or more ends of the NAND strings for a 3D NAND memory device (e.g., a 3D NAND memory device can be erased using a one-sided erase in which Verase is applied to the drain end of the NAND strings via the bit lines, or using a two-sided erase in which Verase is also applied to the source end of the NAND strings via the source lines). After which, the erase verify test may be performed. One example of an erase verify test comprises applies an erase verify voltage (VvE) to the word lines while performing a sense operation which determines whether each NAND string is in a conductive state.

Figure 6:
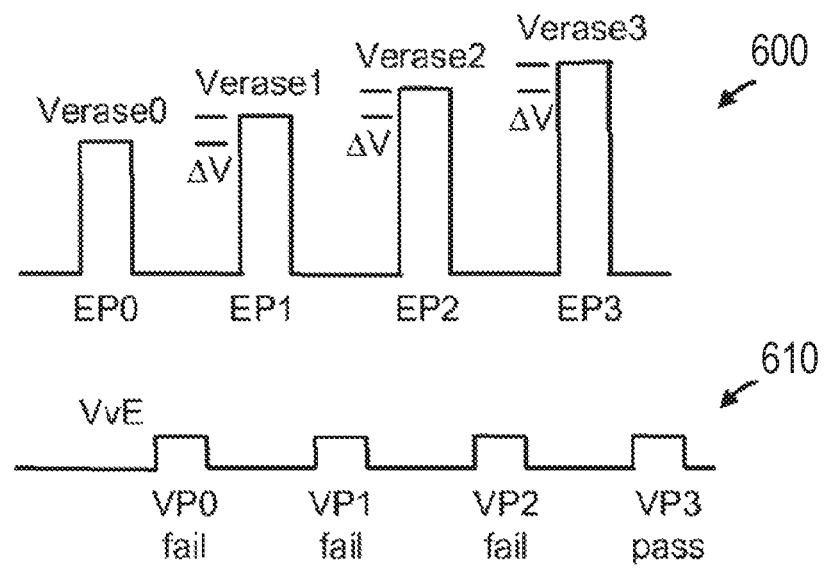
FIG. 6 depicts an example erase operation in which each erase pulse is followed by a verify pulse.

FIG. 6 depicts an example erase operation in which each erase pulse is followed by a verify pulse. An erase operation can be performed for a block of memory cells by applying one or more erase pulses, e.g., EP0-EP3 (waveform 600) to a substrate on which the block is formed in a 2D NAND memory device, or to the ends of the NAND strings in a 3D NAND memory device. After the first erase pulse EP0, the peak amplitude of each erase pulse can be stepped up from the previous erase pulse by a step size $\Delta V$. In one approach, after each erase pulse is applied to the substrate, a verify operation is performed as represented by waveform 610. Waveform 610 shows verify pulses or voltages VP0-VP3 of amplitude VvE which are applied to one or more word lines of memory cells being erased. VP0-VP3 are verify pulses associated with, and following, EP0-EP3, respectively. In this example, it is assumed that the erase operation ends successfully. Thus, the erase-verify test associated with VP0-VP2 is failed, and the erase-verify test associated with VP3 is passed.

Figure 7:
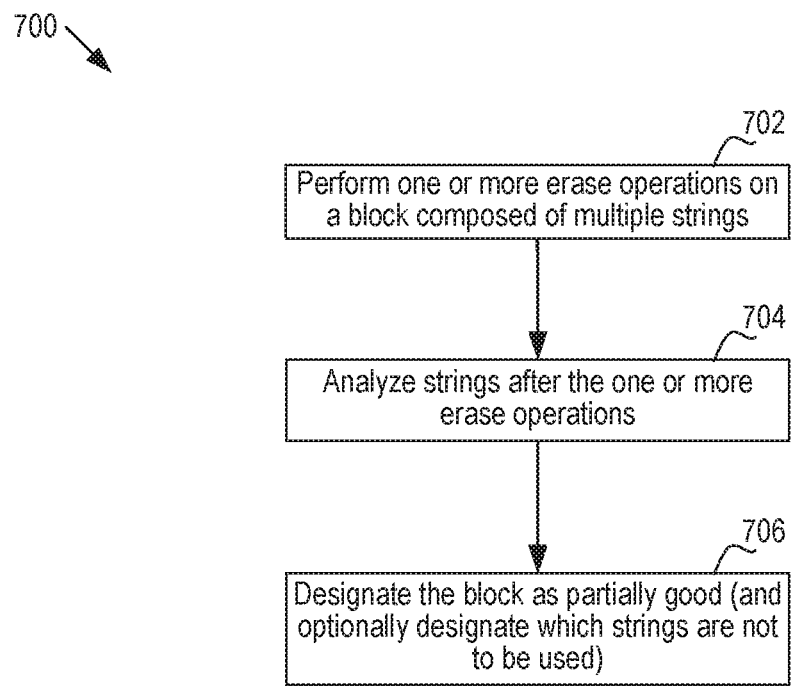
FIG. 7 is a flow chart of an example method of performing one or more erase operations on a block, analyze the results of the erase operations and designating the block as partially good.

FIG. 7 is a flow chart 700 of an example method of performing one or more erase operations on a block, analyze the results of the erase operations and designating the block as partially good. At 702, the memory device performs one or more erase operations on multiple strings in a block. At 704, after the erase operation(s), the memory device analyzes the strings to verify whether the string(s) have been erased. As discussed above, there are various ways in which to verify whether a string has been erased. At 706, in response to determining that some but not all of the strings are verified as having been erased, the memory device designates the block as partially good. Further, the memory device may designate which strings in the block are to be used, and/or designate which strings in the block are not to be used). In this way, the memory device may still partially use a block, such as only the strings that have been verified as erased, even though one or more of the strings fails to be verified as erased.

Figure 8:
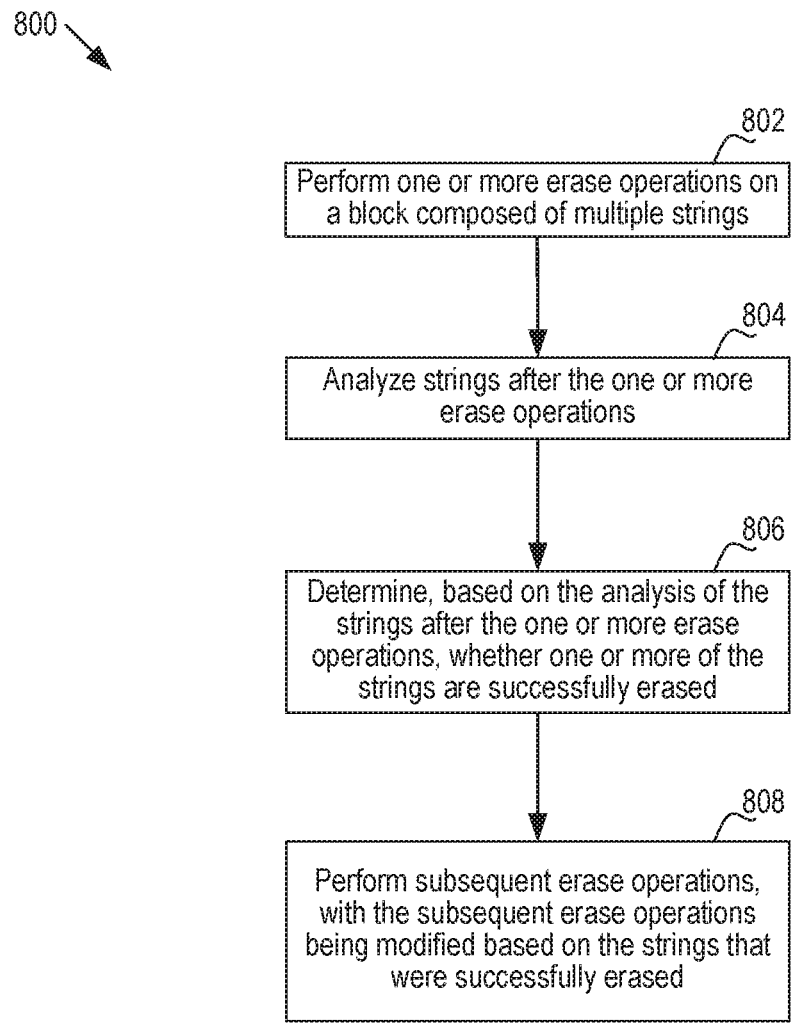
FIG. 8 is a flow chart of a first example method of string-based erase verify to create partial good blocks without single string erase.

FIG. 8 is a flow chart 800 of a first example method of string-based erase verify to create partial good blocks without single string erase. At 802, the memory device performs one or more erase operations on the multiple strings in a block. At 804, the memory device analyzes the strings after the erase operation(s). At 806, the memory device determines, based on the analysis of the strings after the erase operation(s), whether one or more strings are successfully erased. As discussed above, one type of analysis comprises an erase-verify test. At 808, the memory device then performs subsequent erase operations on one or more of the strings in the block, with the subsequent erase operations being modified based on the strings that were successfully erased. In a memory device without the capability to perform an erase on a single string, the modification of the subsequent erase operations may comprise the number of times that the subsequent erase operations is performed. As discussed below with regard to FIG. 9, the number of subsequent erase operations may be limited by the "guard band", as discussed in more detail below. In a memory device with the capability to perform an erase on a single string, the modification of the subsequent erase operations may comprise limiting the subsequent erase operations only to strings that failed to successfully be erased (and exclude the strings that were determined to successfully be erased).

Figure 9:
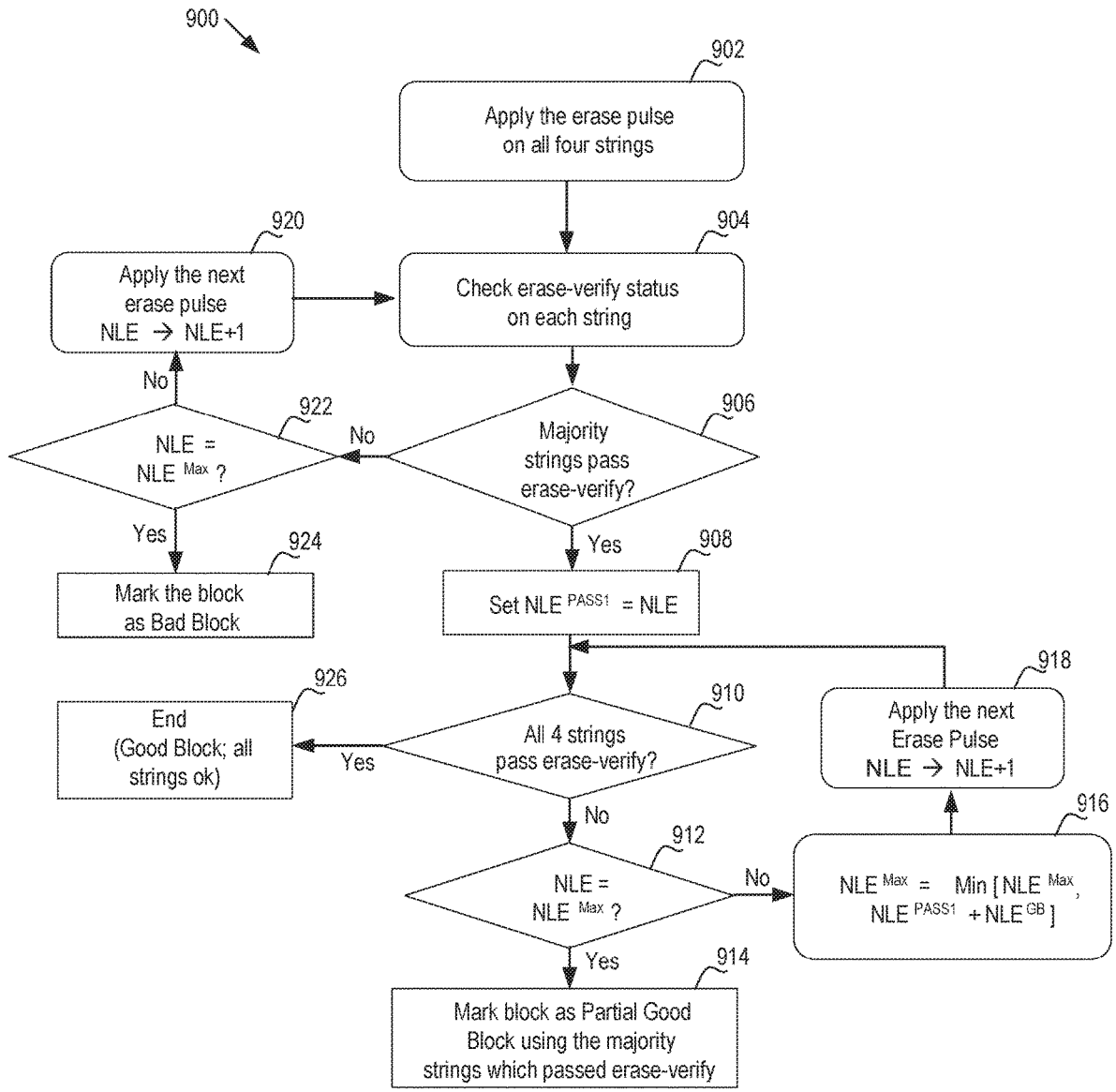
FIG. 9 is a flow chart of a second example method of string-based erase verify to create partial good blocks without single string erase.

FIG. 9 is a flow chart 900 of a second example method of string-based erase verify to create partial good blocks without single string erase. The flow chart 900 is directed to a block that is composed of four strings. Other numbers of strings in a block are contemplated. At 902, the memory device applies the erase pulse on all four strings in the block. At 904, the memory device checks the erase verify status on each of the four strings in the block. There are various methods in which to check the erase verify status, such as illustrated in FIG. 6. At 906, the memory device determines whether a majority of the strings in the block have passed erase-verify (e.g., applying an erase verify voltage (VvE) to the word lines while performing a sense operation which determines whether each NAND string is in a conductive state).

If yes, at 908, the memory device sets an internal variable ($NLE^{PASS1}$) to the erase loop count (NLE, a counter variable which is initially set to one). As discussed in more detail below, $NLE^{PASS1}$ is used with another variable ($NLE^{GB}$) to limit the number of erase pulse iterations. At 910, the memory device determines if all four strings in the block have passed erase-verify. If yes, at 926, the block is designated as a "Good Block", which is indicative that all of the strings in the block are usable. If no, at 912, the counter variable NLE is compared with $NLE^{MAX}$. $NLE^{MAX}$ is a variable that indicates the maximum number of times the erase loop is performed. In this regard, $NLE^{MAX}$ may comprise an upper limit for the predetermined number of iterations. If $NLE=NLE^{MAX}$ at 914, the memory device designates the block as a "Partial Good Block", which is indicative that a majority of the strings in the block are usable. Optionally, the memory device may further designate which strings in the block are usable.

If $NLE<NLE^{MAX}$ at 916, the memory device sets the value for $NLE^{MAX}$. In particular, $NLE^{MAX}$ may be the minimum of two values: (1) the predetermined value as defined by the system for $NLE^{MAX}$; or (2) the sum of $NLE^{PASS1}$ and $NLE^{GB}$. At 918, the memory device applies the next erase pulse (such as illustrated in FIG. 6) to all the strings in the block (e.g., performs a deeper erase), increments the NLE counter, and then loops back to 910.

As discussed above, applying higher voltage erase pulses to strings that have already passed the erase-verify may damage the strings. In this regard, in one implementation, the memory device may limit the number of iterations of the erase loop. In this case, the sum of $NLE^{PASS1}$ and $NLE^{GB}$ may be used to limit the number of times the "good" strings are subjected to higher erase voltages. In other words, $NLE^{GB}$ acts as a guard band, by which the range of iterations is limited to a certain predetermined number greater than the number of iterations taken to pass a majority of the strings. By way of example, $NLE^{MAX}$ may equal 6, and $NLE^{GB}$ may equal 2. Further, by way of example, $NLE^{PASS1}$ may equal 1 (meaning that the majority of strings in the block pass erase-verify on the first pass). Thus, $NLE^{MAX}$ is the lesser of 6 or 3. Because $NLE^{MAX}$ is the lesser of the predetermined value as defined by the system for $NLE^{MAX}$ and the sum of $NLE^{PASS1}$ and $NLE^{GB}$, in this example, the memory device iterates only a total of 3 times (not 6 times) before determining whether the block is partially good, thus limiting the potential damage caused to the strings that passed the erase-verify.

If at 906, the majority of strings in the block to not pass erase-verify, flow chart 900 moves to 922, which determines whether the counter $NLE=NLE^{MAX}$. If so, the block is designated as a "Bad Block". In this example, "Bad Block" indicates that fewer a majority of the strings in the block are usable. In another implementation, "Bad Block" may indicate that none of the strings in the block are usable. If at 922, NLE does note equal $NLE^{MAX}$, at 920, the memory device applies the next erase pulse (such as illustrated in FIG. 6) to all the strings in the block, increments the NLE counter, and then loops back to 904.

Figure 10:
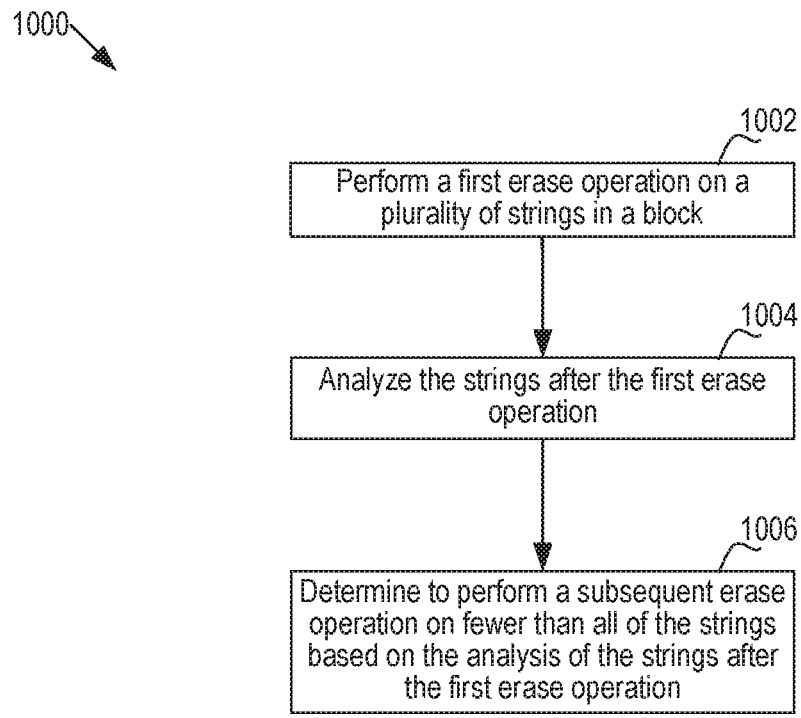
FIG. 10 is a flow chart of a first example method of string-based erase verify to create partial good blocks with single string erase.

FIG. 10 is a flow chart 1000 of a first example method of string-based erase verify to create partial good blocks with single string erase. At 1002, the memory device performs a first erase operation on the plurality of strings in a block. At 1004, the memory device analyzes the strings after the first erase operation. For example, the memory device may perform a verification whether the strings were erased. At 1006, the memory device determines whether to perform a subsequent erase operation on fewer than all of the strings in the block based on the analysis performed at 1004. For example, certain memory devices are configured to perform single string erases. In particular, for a four string block, the memory device may perform an erase on any one of the first, second, third, or fourth strings in the block. In this regard, in response to determining that one of the four strings is verified as erased, on a next iteration, the erase-verified strings need not undergo further erase operations. This is in contrast to a memory device that is configured only to perform erase operations on an entire block, such as discussed with regard to FIG. 9. In such a configuration, subsequent erase operations are performed on all of the strings in the block, regardless of whether the strings were verified as erased or not.

Figure 11:
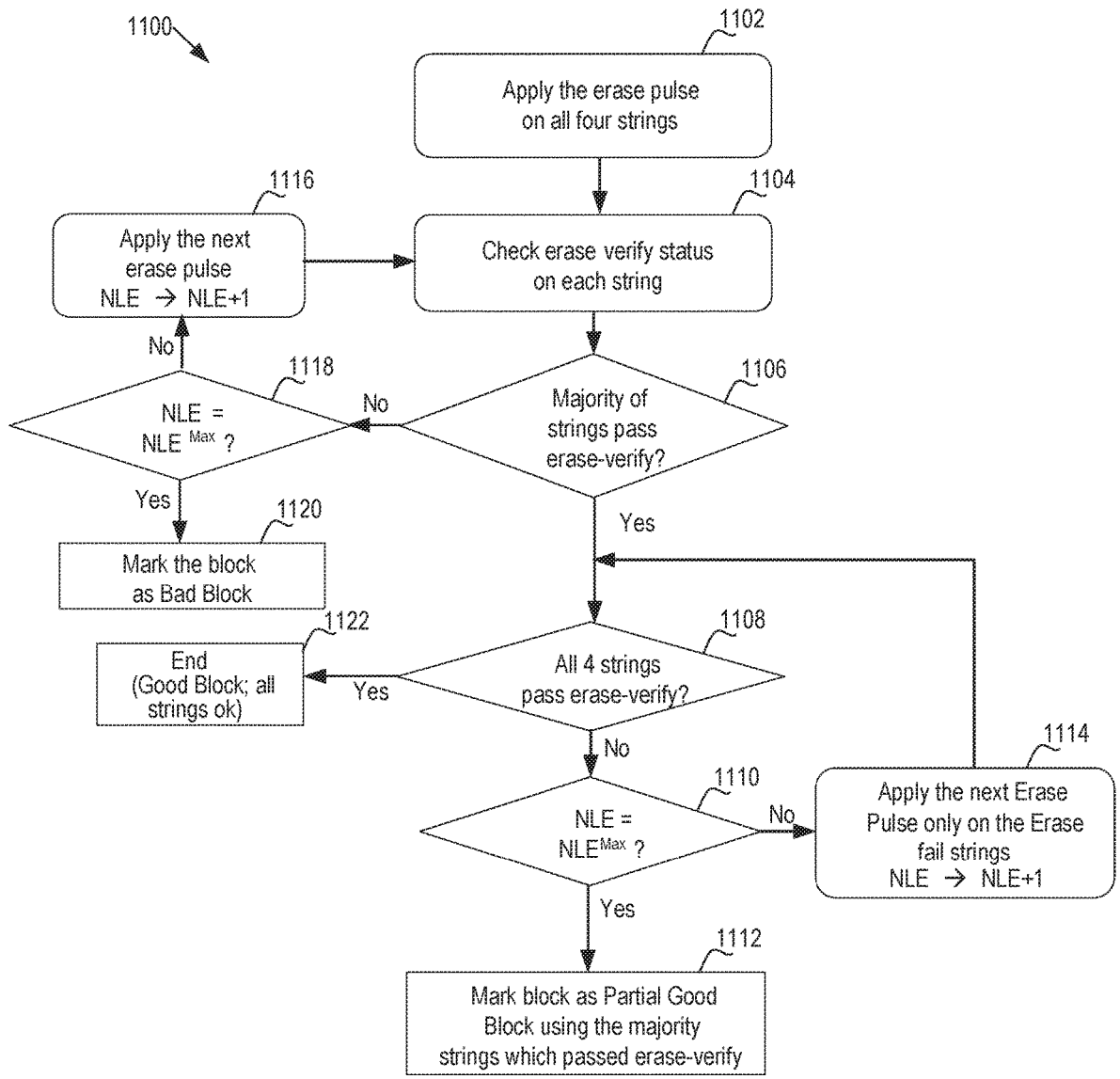
FIG. 11 is a flow chart of a second example method of string-based erase verify to create partial good blocks with single string erase.

FIG. 11 is a flow chart 1100 of a second example method of string-based erase verify to create partial good blocks with single string erase. Similar to FIG. 9, the flow chart 1100 is directed to a block that is composed of four strings. Other numbers of strings in a block are contemplated. At 1102, the memory device applies the erase pulse on all four strings in the block. At 1104, the memory device checks the erase verify status on each of the four strings in the block. At 1106, the memory device determines whether a majority of the strings in the block have passed erase-verify. Thus, in one implementation, the flow chart 1100 moves to 1108 if the majority of the strings in the block have passed erase-verify. In an alternate implementation, the flow chart 1100 moves to 1108 if less than a majority of the strings in the block have passed erase-verify (such as only one of the strings in the block have passed erase-verify).

If yes, at 1108, the memory device determines if all four strings in the block have passed erase-verify. If yes, at 1122, the block is designated as a "Good Block", which is indicative that all of the strings in the block are usable. If no, at 1110, the counter variable NLE is compared with $NLE^{MAX}$. As discussed above, $NLE^{MAX}$ is a variable that indicates the maximum number of times the erase loop is performed. If $NLE=NLE^{MAX}$ at 1112, the memory device designates the block as a "Partial Good Block", which is indicative that a majority of the strings in the block are usable. Optionally, the memory device may further designate which strings in the block are usable. If $NLE<NLE^{MAX}$ at 1114, the memory device applies the next erase pulse (such as illustrated in FIG. 6) to only the strings that have failed the erase-verify, increments the NLE counter, and then loops back to 1108.

If at 1106, the majority of strings in the block to not pass erase-verify, flow chart 1100 moves to 1118, which determines whether the counter $NLE=NLE^{MAX}$. If so, the block is designated as a "Bad Block". In this example, "Bad Block" indicates that fewer a majority of the strings in the block are usable. In another implementation, "Bad Block" may indicate that none of the strings in the block are usable.

If at 1118, NLE does note equal $NLE^{MAX}$, at 1116, the memory device applies the next erase pulse (such as illustrated in FIG. 6) to all the strings in the block, increments the NLE counter, and then loops back to 1104.

Lastly, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

The invention claimed is:

1. A non-volatile memory device, comprising:
a plurality of strings in a block of the non-volatile memory device, the plurality of strings comprise a plurality of memory cells arranged vertically; and
a control circuit, the control circuit in communication with the plurality of strings in the block and configured to:
command an erase of the plurality of strings in the block;
analyze an erase state of each of the plurality of strings to determine an individual erase status for each of the plurality of strings corresponding to whether each of the plurality of strings is individually verified as erased;
iteratively command the erase of at least a set of the plurality of strings in response to determining that at least one of the plurality of strings is not verified as erased, wherein a number of iterations is determined based on a comparison of the number of iterations to a predetermined maximum number of iterations;
adjust the predetermined maximum number of iterations if the number of iterations is less than the predetermined maximum number of iterations; and
in response to determining that at least one but fewer than all of the plurality of strings is verified as erased, designate the block as partially usable, with the designation indicating that at least one but fewer than all of the plurality of strings are usable by the non-volatile memory device to store data.

2. The non-volatile memory device of claim 1, wherein the control circuit is configured to iteratively command the erase, and determine verification of the erase for all of the plurality of strings regardless of the erase verification of the plurality of strings.

3. The non-volatile memory device of claim 2, wherein adjusting the predetermined maximum number of iterations if the number of iterations is less than the predetermined maximum number of iterations is completed dynamically.

4. The non-volatile memory device of claim 1, wherein adjusting the predetermined maximum number of iterations if the number of iterations is less than the predetermined maximum number of iterations is based on the plurality of strings that are verified as erased.

5. The non-volatile memory device of claim 1, wherein adjusting the predetermined maximum number of iterations if the number of iterations is less than the predetermined maximum number of iterations is based on a number of iterations since a majority of the plurality of strings are verified as erased.

6. A non-volatile memory device, comprising:
a plurality of strings in a block, the plurality of strings comprise a plurality of memory cells; and
a control circuit, the control circuit in communication with the plurality of strings in the block and configured to iteratively:
command an erase of the plurality of strings in the block;
analyze an erase state of each of the plurality of strings in the block to determine an individual erase status for each of the plurality of strings corresponding to whether each of the plurality of strings is individually verified as erased,
command the erase of at least a set of the plurality of strings in response to determining that at least one of the plurality of strings is not verified as erased,
wherein a number of iterations is determined based on a comparison of the number of iterations to a predetermined maximum number of iterations and the control circuit is configured to adjust the predetermined maximum number of iterations if the number of iterations is less than the predetermined maximum number of iterations.

7. The non-volatile memory device of claim 6, wherein the control circuit is configured to determine the number of iterations based on the plurality of strings that are verified as erased.

8. The non-volatile memory device of claim 6, wherein adjusting the predetermined maximum number of iterations if the number of iterations is less than the predetermined maximum number of iterations is based on whether one or more of the plurality of strings are verified as erased.

9. The non-volatile memory device of claim 6, wherein the at least the set of the plurality of strings includes only the strings that are not verified as erased and not the strings that are verified as erased.

10. The non-volatile memory device of claim 6, wherein the plurality of strings comprise NAND strings.

11. A method comprising:
commanding an erase of a plurality of vertical strings in a block of a non-volatile memory device;
analyzing an erase state of each of the plurality of vertical strings to determine an individual erase status for each of the plurality of strings corresponding to whether each of the plurality of vertical strings is individually verified as erased;
iteratively commanding the erase of at least a set of the plurality of strings in response to determining that at least one of the plurality of strings is not verified as erased, wherein a number of iterations is determined based on a comparison of the number of iterations to a predetermined maximum number of iterations;
adjusting the predetermined maximum number of iterations if the number of iterations is less than the predetermined maximum number of iterations; and
in response to determining that at least one but fewer than all of the plurality of vertical strings is verified as erased, designating the block as partially usable, with the designation indicating that at least one but fewer than all of the plurality of vertical strings are usable by the non-volatile memory device to store data.

12. The method of claim 11, wherein the plurality of strings comprise NAND strings.

13. A non-volatile memory device comprising:
a non-volatile memory having a plurality of strings in a block; and
means for iteratively commanding an erase of the plurality of strings in the block, analyzing an erase state of each of the plurality of strings in the block; and determining an individual erase status for each of the plurality of strings corresponding to whether each of the plurality of strings is individually verified as erased, commanding the erase of at least a set of the plurality of strings in response to determining that at least one of the plurality of strings is not verified as erased, wherein a number of iterations is determined based on a comparison of the number of iterations to a predetermined maximum number of iterations and based on a comparison of the number of iterations to a predetermined maximum number of iterations and the means adjusts the predetermined maximum number of iterations if the number of iterations is less than the predetermined maximum number of iterations.

14. The non-volatile memory device of claim 13, wherein the means adjusts the number of iterations based on whether one or more of the strings are verified as erased.

15. The non-volatile memory device of claim 14, wherein the at least the set of the plurality of strings includes only the strings that are not verified as erased and not the strings that are verified as erased.

16. The non-volatile memory device of claim 1, wherein the at least the set of the plurality of strings includes only at least one string of the plurality of strings that are not verified as erased and not at least one string of the plurality of strings that are verified as erased.

17. The non-volatile memory device of claim 1, wherein adjusting the predetermined maximum number of iterations if the number of iterations is less than the predetermined maximum number of iterations includes setting the predetermined maximum number of iterations as a minimum of the predetermined maximum number of iterations or a sum of a first internal variable and a second internal variable.

18. The non-volatile memory device of claim 17, wherein the first internal variable is set to the number of iterations since a majority of the plurality of strings are verified as erased and the second internal variable is a predetermined guard number of iterations being less than the predetermined maximum number of iterations.

* * * * *